United States Patent Office 2,940,824
Patented June 14, 1960

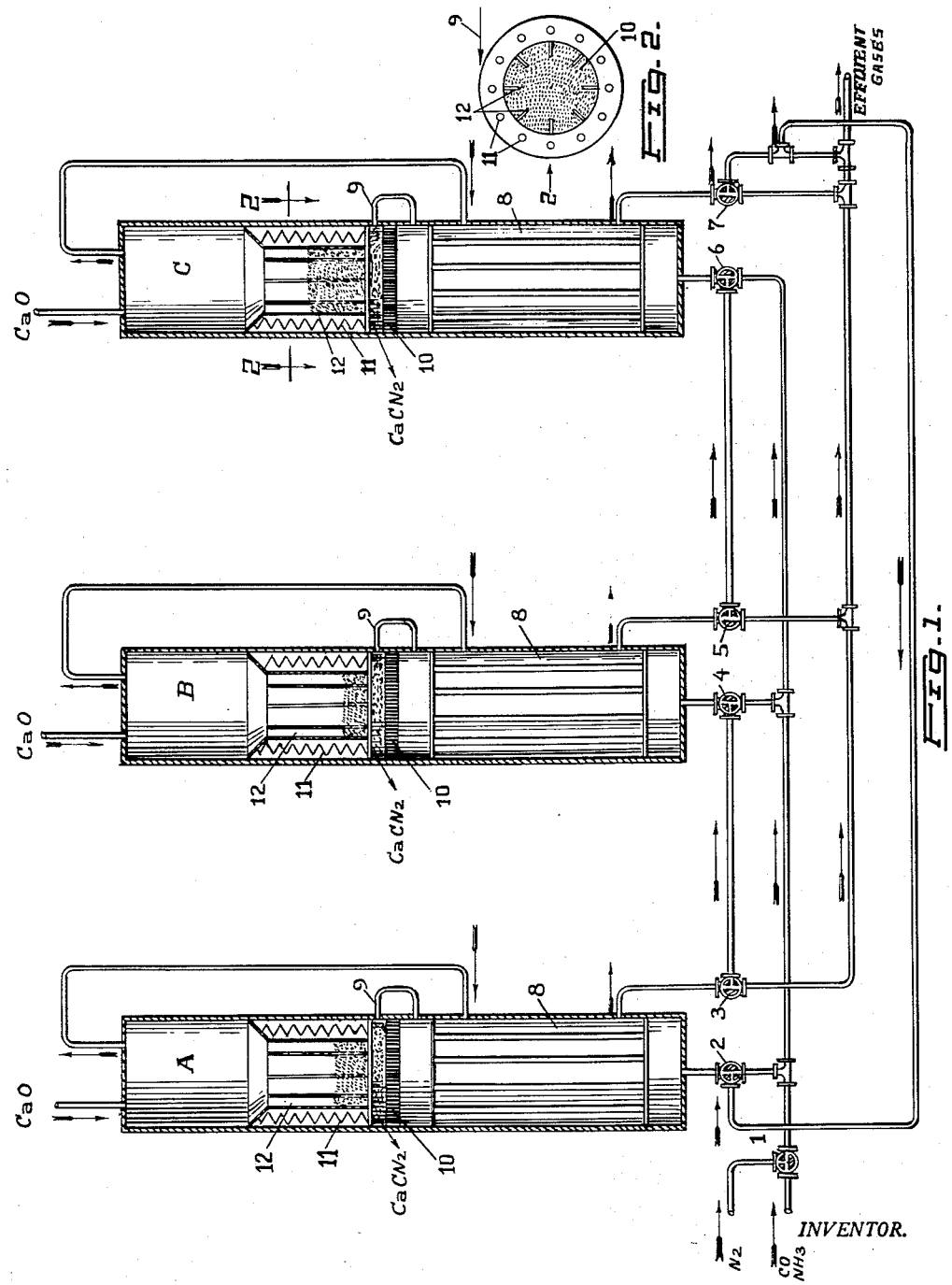

2,940,824

MANUFACTURE OF WHITE CALCIUM CYANAMIDE

Franz Kaess and Hermann Kronacher, Trostberg, Herwig Hoeger, Wimm, near Trostberg, and Walter Dichtl, Trostberg-Schwarzau, Germany, assignors to Süddeutsche Kalkstickstoff-Werke A.G., Trostberg, Germany Filed Sept. 30, 1955, Ser. No. 537,838

4 Claims. (Cl. 23—78)

The invention relates to the manufacture of so-called white calcium cyanamide.

Calcium cyanamide can be prepared by the reaction of ammonia or of ammonia-carbon monoxide mixtures with calcium carbonate or burnt lime. Because of the light aspect of the thus obtained product, it has been designated white calcium cyanamide. The same type of product is obtained by the reaction of dilute or concentrated hydrocyanic acid gas with lime. In this way, products are obtained which contain up to 35 percent of N and are substantially free of carbon deposits.

Various types of furnaces have been proposed for the preparation of white calcium cyanamide, mostly shaft furnaces or also multiple-hearth furnaces. It has also been proposed to use furnaces which are a combination of lime kilns and carbide nitrogenating furnaces. However, the results obtained with said furnaces have not been satisfactory, due, on the one hand, to the mechanical difficulties involved, and on the other hand, to the low conversion or high decomposition of the used ammonia.

The mechanical difficulties are caused mainly by the caking of the lime during the reaction, which caking stops the downward movement of the charge in shaft furnaces or causes clogging. In addition, it was found that the enrichment of calcium cyanamide in such furnaces is not uniform and that, therefore, it is not, or only difficultly, possible to withdraw a high percent calcium cyanamide. In this respect, it does not make any difference whether calcium carbonate or calcium oxide is used as starting material. The manufacture of white calcium cyanamide by means of hydrocyanic acid gas, be it used alone or with a carrier gas, has the economic drawback that it requires, in addition to the recited difficulties, processing the effluent leaving the synthesis as well as the effluent leaving the cyanamide oven. The recited difficulties have prevented the large scale manufacture of white calcium cyanamide.

It is a principal object of the invention to provide a method which eliminates the recited drawbacks and particularly prevents the caking of the lime during nitrogenation.

It is another object of the invention to provide a furnace suitable for the manufacture of white calcium cyanamide.

Other objects and advantages will be apparent from a consideration of the specification and claims.

According to our invention, the difficulties of the methods used heretofore are overcome by keeping the lime in turbulent floating condition by the pressure of the gas mixtures passing through the reactor.

For the preparation of white calcium cyanamide, calcium chloride or sulfate are useful as catalysts. However, if said salts are admixed to lime and said mixture is floated by the pressure of the gases, they tend to separate from the heavier line granules; as a result, the purpose of the addition of the catalyst is at least partially defeated. In a preferred embodiment of the invention, we pretreat, therefore, the lime with dry hydrogen chloride or sulfur dioxide for a time sufficient to obtain in the lime a concentration of about .8 to 1.5 percent by weight of calcium chloride or sulfate. Said calcium chloride or sulfate covers the individual lime particles, and acts not only as a catalyst but also assists in preventing caking of the material during the reaction.

The reaction is preferably carried out in furnaces which are made of, or lined with, a refractory material which, at the temperatures of the reaction, causes as little decomposition of ammonia as possible. Suitable materials are, for instance, aluminum silicate or sintered alumina.

If calcium carbonate is used as starting material, the reaction is slightly endothermic (−23 kcal.); in the case of calcium oxide, the reaction is exothermic by 20.7 kcal. In the first case, therefore, corresponding heat supply is necessary.

An apparatus suitable for carrying out the reaction is, by way of example, illustrated in the accompanying drawing, wherein:

Fig. 1 is a diagrammatic view of an apparatus suitable to carry out the invention, and Fig. 2 is a section taken on the line A—A of Fig. 1.

The apparatus shown in Fig. 1 consists of 3 similar cylindrical turbulence reactors A, B, C, connected in series. The bottom section of each reactor forms a recuperator 8 in which the gases entering the reactor are heated up in heat exchange contact with the effluent gases. The charge filled in the reactor is supported on the porous ceramic grids 10 and kept in turbulent motion by the up-flowing gases. At least part of said gases may be tangentially introduced above the grid through line 9 to assist the turbulent motion of the charge in the reaction space provided above the grid 10. Said reaction space is surrounded by electrical heating elements 11, and heating surfaces 12 are provided which project radially inwardly from the walls of the reaction space. The gas flow is controlled by three-way valves 1, 2, 3, 4, 5, 6, and 7.

Instead of, or in addition to, the recuperators 8, a separate recuperator may be provided in which the fresh gas is heated up by the gases which come from the reactors.

The ratio $CO:NH_3$ in the gas mixture and the rate of flow are so adjusted that the gas pressure is sufficient for imparting turbulence to the solid charge, and the charge is retained in the reactor in contact with the gas until an N content of about 21 to 35 percent by weight is obtained. For the above recited grain size of .2 to 1 mm., a linear gas velocity of 10 to 40 cm./sec., calculated on the empty reaction space, is required. The required pressure depends, of course, on the height of the charge.

The gases leaving a first reactor are preferably passed in a second and/or third reactor. We have found that an increasing $CaCN_2$ content of the charge in contact with gases containing a high proportion of ammonia favors the decomposition of said ammonia, whereas such decomposition does not take place in contact with gases wherein the ammonia is strongly diluted by carbon monoxide. The process is therefore carried out in such a way that always the reactors containing the lowest $CaCN_2$ concentration are passed by the gases containing the highest $NH_3$ concentration, whereas the reactors containing already high $CaCN_2$ concentration receive gas mixtures containing a lower $NH_3$ content. In this way, the conversion of the gases in which the ammonia or hydrocyanic acid has been partially exhausted by previous reaction, are further converted and the calcium cyanamide content of the charge can be enriched to the theoretic maximum of 35%.

After the calcium cyanamide has reached the desired concentration, it is withdrawn and replaced by fresh lime, whereupon the path of the gases is again switched in the manner set forth above.

In order to reduce further the risk of ammonia decomposition, the temperatures in the different turbulence zones may be varied in such a manner that higher temperatures are used in zones of reduced ammonia concentration; in this way, the decreasing rate of reaction and conversion due to decrease ammonia concentration is counter-balanced by increased temperature.

Instead of using a plurality of reactors for the successive turbulent reaction zones, said reaction zones may be provided in a single multiple stage reactor as described in the copending application, Serial No. 525,714, by Franz Kaess, Hermann Kronacher, Bernhard Arnolds, Werner Wehrheim, filed August 1, 1955, for a method and apparatus for the manufacture of hydrogen cyanide. For the purposes of this invention, the reactor described in said application is not filled with a catalyst but with calcium carbonate or lime.

As set forth above, the formation of calcium cyanamide from lime and ammonia carbon monoxide mixtures at the recited temperatures is a slightly exothermic reaction, which requires only a small heat supply for maintaining the reaction in the turbulence zone. Said heat supply may be provided by preheating the gases in heat exchange with the effluent gases in recuperators arranged below the reactor and consisting of metallic or refractory material; in addition, heating surfaces may be provided which project in the reaction zone or are disposed in the walls of the lower portion of the reactor. Care has to be taken that the temperature differential between reaction space and heating surface is as small as possible to prevent decomposition on the heat surfaces.

Particularly if our method is carried out as a multiple stage process, high yields are obtained only when gases blocking the reaction, such as carbon dioxide, are removed. A removal by means of aqueous solutions or alkaline agents is not possible, in the latter case particularly because also the hydrogen cyanide of the gases would be removed from the reacting gases by formation of alkali metal cyanides. We have found that it is possible to remove carbon dioxide by means of calcium hydroxide maintained in floating condition in a similar way as the lime in the reactor. In order to remove the carbon dioxide, the effluent of one reaction stage is cooled in a recuperator to the temperature where it reacts with calcium hydroxide kept floating therein, and after removal of the carbon dioxide is heated up again to reaction temperature and returned into the process, whereby the incoming and outgoing gases pass through the same recuperator. It is not necessary to effect complete removal of the carbon dioxide but it is sufficient to reduce the $CO_2$ content of the gases to about 1%.

Instead of using vertical reactors as described herein, it is also possible to use horizontal furnaces as described for the preparation of calcium cyanamide from carbide in the copending application, Serial No. 522,344, by Thomas Fischer, Hermann Kronacher, and Franz Kaess, filed July 15, 1955, now Patent No. 2,838,379 and introduce the gases tangentially into the reaction zone through the walls of the furnace.

According to the color of the starting material, we obtain a white to gray calcium cyanamide. A darker shade due to the decomposition of carbon monoxide can be avoided if the lime does never come in contact with carbon monoxide alone. This precaution is particularly important on starting the process. According to the particle size of the starting material, a powdery or slightly gravelly product is obtained, which has all the chemical properties of black calcium cyanamide and is particularly suitable for the preparation of mixed fertilizer or for chemical reactions.

The following example is given to illustrate a preferred method of carrying out the invention, it being understood that the invention is not limited to the details set forth in the example.

*Example*

The three reactors of a battery as illustrated in the drawing were each filled with 5 kg. of CaO having a particle size of .2 to 1 mm., which had previously been treated with hydrogen halid gas until they contained 1.3 percent of $CaCl_2$. Nitrogen was passed successively through the reactors and was heated electrically and by heat exchange to 800° C. Then the nitrogen was replaced by a mixture consisting of 2 parts by volume of carbon monoxide and 1 part by volume of ammonia; 4.5 m.³/hour of said mixture were introduced into the reactor C. After 5 hours, the fresh gas was switched to reactor B and passed from said reactor to reactor C; after further five hours the gas was passed consectively through the reactors A, B, and C. In order to balance the heat losses, the individual reactors received from the electric heating systems by means of the heating surfaces so much heat that the reaction temperature was maintained at 760 to 780° C. After a 12 hour nitrogenation of the charge in reactor C, the gas admission to said reactor was turned off and the charge removed, and the reactor was filled with a preheated fresh charge. The yield was 6.7 kg. of $CaCN_2$ containing 31 percent of N. A sample taken at the same time from reactor B contained 27 percent of N and a sample from reactor A 21 percent of N. The gas was then passed through the reactors in the order C—A—B, and every 5 hours the completely nitrogenated charge was removed and replaced, and the gas cycle accordingly adjusted. The N content of the end product was always between 29 and 33%, corresponding to 83 to 94 percent of $CaCN_2$.

The effluent of the last reactor contained about 13% $CO_2$, 16% $NH_3$, 20% $H_2$, and 2% HCN, the balance being carbon monoxide, water vapor, and nitrogen. This effluent was passed through a vessel containing powdery $Ca(OH)_2$, where on entering it had a temperature of about 120 to 160° C., and freed therein from carbon dioxide. Subsequently, ammonia and hydrocyanic acid were washed out, recovered by distilling the watery solution and admixed to the fresh gases.

The carbon monoxide was separated from hydrogen and nitrogen by the conventional copper wash under pressure, and also recycled.

We claim:

1. A method of preparing calcium cyanamide comprising treating a finely divided compound selected from the group consisting of calicum carbonate and calcium oxide with a gas selected from the group consisting of hydrogen chloride and sulfur dioxide until it contains about 0.8 to 1.5 percent by weight of the respective calcium salt, placing said compound in a reaction zone, and passing through said reaction zone at a temperature of about 600 to 900° C. a gas mixture containing carbon monoxide and ammonia at a rate of flow and a pressure maintaining said compound floating in turbulent motion in said reaction zone.

2. The method claimed in claim 1 comprising the step of passing the gases leaving the reaction zone through a zone containing powdery calcium hydroxide in floating condition, thereby removing carbon dioxide contained in said gases.

3. The method as claimed in claim 1 comprising passing the gases leaving said reaction zone into at least one further reaction zone containing said compound in already partially nitrogenated condition.

4. The method claimed in claim 3, including the step of passing the gases leaving a reaction zone through a zone containing powdery calcium hydroxide in floating condition, thereby removing carbon dioxide contained in said gases, and then passing the gases into the next reaction zone.

(References on following page)

References Cited in the file of this patent

UNITED STATES PATENTS

| | | |
|---|---|---|
| 1,021,445 | Bonnington et al. | Mar. 26, 1912 |
| 1,100,539 | Cooper | June 16, 1914 |
| 1,745,350 | Caro et al. | Feb. 4, 1930 |
| 2,625,464 | Roberts et al. | Jan. 13, 1953 |
| 2,632,687 | Walter | Mar. 24, 1953 |
| 2,638,684 | Jukkola | May 19, 1953 |
| 2,797,979 | Daniels et al. | July 2, 1957 |

FOREIGN PATENTS

| | | |
|---|---|---|
| 1,090,431 | France | Mar. 30, 1955 |

OTHER REFERENCES

Jacobson: Encyclopedia of Chemical Reactions, vol. II, 1948, pages 140–141; pages 55 and 129.